(12) United States Patent
Nakahama et al.

(10) Patent No.: US 8,247,099 B2
(45) Date of Patent: Aug. 21, 2012

(54) GAS EXHAUST STRUCTURE OF BATTERY

(75) Inventors: Takafumi Nakahama, Fuchu (JP);
Takeo Kakuchi, Chofu (JP); Nobumitsu Tada, Hachioji (JP); Taihei Koyama, Tachikawa (JP); Norihito Togashi, Yokohama (JP); Kenya Kurokawa, Fuchu (JP); Tadashi Shudo, Asaka (JP); Mami Mizutani, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 391 days.

(21) Appl. No.: 12/567,056

(22) Filed: Sep. 25, 2009

(65) Prior Publication Data
US 2010/0081039 A1 Apr. 1, 2010

(30) Foreign Application Priority Data
Sep. 30, 2008 (JP) ................. P2008-254889

(51) Int. Cl.
*H01M 2/12* (2006.01)
(52) U.S. Cl. .......................... 429/56; 429/53
(58) Field of Classification Search .............. 429/56, 429/53
See application file for complete search history.

(56) References Cited

U.S. PATENT DOCUMENTS

| 4,403,019 A * | 9/1983 | Poe ................................ 429/53 |
| 6,761,996 B1 * | 7/2004 | Kim et al. ..................... 429/185 |
| 7,758,994 B2 * | 7/2010 | Komori et al. ................. 429/53 |
| 2002/0132160 A1 * | 9/2002 | Ehara ............................. 429/53 |

FOREIGN PATENT DOCUMENTS

JP 2002-216731 8/2002

\* cited by examiner

*Primary Examiner* — John S Maples
(74) *Attorney, Agent, or Firm* — Oblon, Spivak, McClelland, Maier & Neustadt, L.L.P.

(57) ABSTRACT

A gas exhaust structure of a battery includes a rupture valve formed in a battery body, and a pipe unit composed by integrating a coupling pipe and an exhaust pipe with each other. A one-side opening of the coupling pipe is coupled to the rupture valve. The exhaust pipe is coupled to an other-side opening of the coupling pipe, guides gas that spouts out from an inside of the battery body through the rupture valve and the one-side opening of the coupling pipe, and exhausts the gas to an outside. The exhaust pipe is arranged to be offset with respect to the rupture valve without allowing an extended line that passes through a center of the rupture valve and a centerline of the exhaust pipe to be perpendicular to each other.

8 Claims, 5 Drawing Sheets

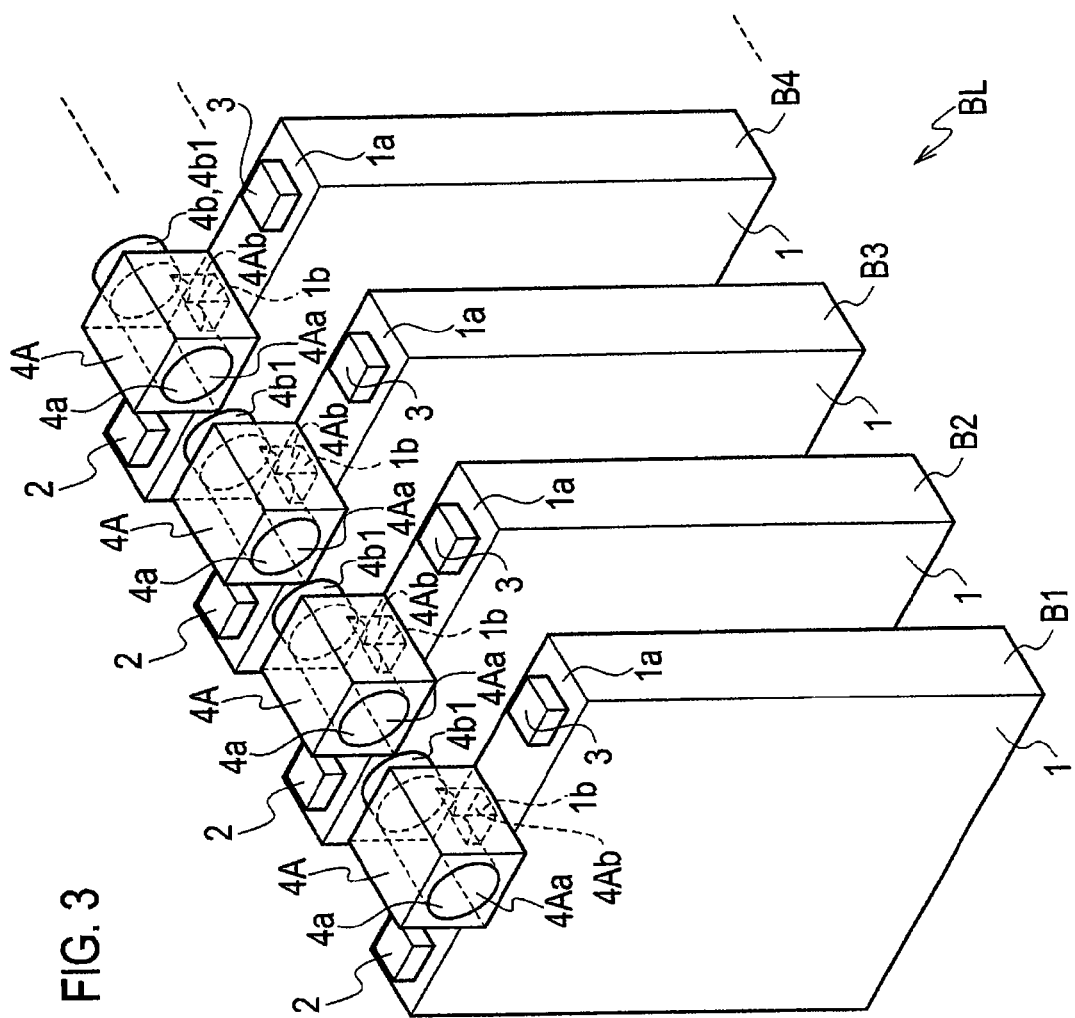

GAS EXHAUST STRUCTURE OF BATTERY

BACKGROUND OF THE INVENTION

1. Field of the Invention

The present invention relates to a gas exhaust structure of a battery, which is capable of instantaneously exhausting, to an outside, gas that abruptly spouts out from an inside of a battery by an impact applied from the outside.

2. Description of the Related Art

In recent years, as one of drive sources for driving a vehicle such as an electric vehicle and a hybrid vehicle, a battery that is a secondary battery has been used gradually and increasingly. As such a battery for the vehicle drive source, there is one configured as one battery column formed by stacking (serially connecting) a large number of unitized batteries on one another. Such formation of the battery column facilitates handling of a large number of the batteries, and in addition, makes it possible to obtain a high voltage for the vehicle drive source.

Incidentally, when a large external impact is applied to the battery owing to an accident and the like in the case where such a battery column is used while being mounted on the vehicle, a large amount of combustible gas such as hydrogen abruptly spouts out from the battery, which composes the battery column, in response to this impact application. Then, it is apprehended that the battery may explode unless the spouting gas from the battery is relieved. It is said that an internal pressure of the battery at this time rises to approximately 7 atmospheric pressures.

In order to prevent such a situation, the battery includes a gas exhaust structure for instantaneously exhausting such high-pressure gas to an outside (Japanese Patent Laid-Open Publication No. 2002-216731 as Patent Publication 1).

FIGS. 1A and 1B are views for explaining the conventional gas exhaust structure of the battery.

As shown in FIGS. 1A and 1B, a unitized battery A includes a battery body 1, positive and negative electrodes 2 and 3, and a pipe unit 4. The positive and negative electrodes 2 and 3 are individually provided on both end portions of an upper portion 1$a$ of the battery body 1. Moreover, on a portion of the upper portion 1$a$, which is located between the positive and negative electrodes 2 and 3, an incision is incised. Then, this incision is broken from an inside of the body 1 at the time when the gas spouts, and forms a rupture valve 1$b$. Once the rupture valve 1$b$ is formed as described above, it becomes impossible to reuse the battery A.

The pipe unit 4 as a coupling pipe unit instantaneously guides the gas, which spouts out from the inside of the battery body 1 through the rupture valve 1$b$, to an outside of the battery body 1, and then exhausts the gas thereto. The pipe unit 4 is composed by integrating an exhaust pipe 4$a$ and a coupling pipe 4$b$ with each other. The coupling pipe 4$b$ coupled to the rupture valve 1$b$ is coupled to the exhaust pipe 4$a$.

In such a way, when a large number of the batteries A, each of which has the above-described configuration, are stacked on one another, the respective exhaust pipes 4$a$ are sequentially fitted and coupled to one another, and form one gas exhaust passage of the battery column.

SUMMARY OF THE INVENTION

A positional relationship among the rupture valve 1$b$ provided on the upper portion 1$a$ of the battery body 1, the coupling pipe 4$b$ coupled to this rupture valve 1$b$, and the exhaust pipe 4$a$ coupled to this coupling pipe 4$b$ in the above-described conventional gas exhaust structure of the battery is as follows. Specifically, as shown in FIGS. 1A and 1B, a center O of the rupture valve 1$b$ and a centerline c of the coupling pipe 4$b$ are located on the same line, and an extended line thereof is perpendicular to a centerline c of the exhaust pipe 4$a$. As a result, the exhaust pipe 4$a$ is arranged without being offset with respect to the rupture valve 1$b$.

However, as a result of the above-described positional relationship, the gas that spouts out from the inside of the battery body 1 breaks the incision of the upper portion 1$a$ of the battery body 1 to thereby form the rupture valve 1$b$, passes straight through this rupture valve 1$b$ and the coupling pipe 4$b$, and orthogonally collides only with a specific spot of an inner wall 4$a$1 of the exhaust pipe 4$a$. Hence, the inner wall 4$a$1 is required to have strength enough to resist such a collision pressure of the gas.

As a result, it is necessary to increase a thickness of the inner wall 4$a$1 of the exhaust pipe 4$a$ in order to increase physical strength thereof. As a result, a weight per battery is increased, and a weight of the battery column composed by stacking a large number of such heavy batteries on one another is increased in proportion to the number of batteries. Therefore, inconvenience has occurred at the time of exchanging the battery column.

In this connection, the present invention has been created in order to solve this problem. In order to swirl a gas flow, which spouts out from an inside of a battery body and flows into an exhaust pipe, in the exhaust pipe, and to thereby reduce a spouting pressure of the gas flow concerned, the exhaust pipe is arranged to be offset with respect to a gas spouting valve without allowing an extended line that passes through a center of the gas spouting valve and a centerline of the exhaust pipe to be perpendicular to each other. With such a configuration, a collision pressure of the gas flow that orthogonally collides with a specific spot of an inner wall of the exhaust pipe can be weakened. As a result, the inner wall of the exhaust pipe can be thinned more than heretofore, and accordingly, the weight per battery is reduced, and the weight of the battery column composed by stacking a large number of such batteries on one another is reduced in proportion to the number of batteries. It is an object of the present invention to provide a gas exhaust structure of a battery, in which the inconvenience does not occur at the time of exchanging the battery column in such a manner as described above.

In order to solve the above-described problem, a gas exhaust structure of a battery according to a first aspect of the present invention is a gas exhaust structure of a battery, the gas exhaust structure being provided in a battery capable of composing a battery column by being stacked by a large number, including: a gas spouting valve formed in a battery body; and a pipe unit composed by integrating a coupling pipe and an exhaust pipe with each other, wherein a one-side opening of the coupling pipe is coupled to the gas spouting valve, the exhaust pipe is coupled to an other-side opening of the coupling pipe, guides gas that spouts out from an inside of the battery body through the gas spouting valve and the one-side opening of the coupling pipe, and exhausts the gas to an outside. The exhaust pipe is arranged to be offset with respect to the gas spouting valve without allowing an extended line that passes through a center of the gas spouting valve and a centerline of the exhaust pipe to be perpendicular to each other.

With such a configuration, the collision pressure of the gas flow that collides with the specific spot of the inner wall of the exhaust pipe is weakened. As a result, the inner wall of the exhaust pipe can be thinned more than heretofore, and accordingly, the weight per battery is reduced. Therefore, the weight of the battery column composed by stacking a large number of such batteries on one another is further reduced in proportion to the number of batteries. Accordingly, the inconvenience does not occur at the time of exchanging the battery column.

Moreover, in the gas exhaust structure of the battery according to the first aspect of the present invention, it is preferable that the exhaust pipe have a shape capable of forming a gas exhaust passage for the battery column in such a manner that the exhaust pipes are sequentially coupled to one another when a large number of the batteries are stacked on one another.

With such a configuration, when a large number of the batteries are stacked on one another, the respective exhaust pipes are sequentially coupled to one another, whereby the gas exhaust passage for the battery column is formed. Therefore, a large amount of the gas that spouts out from the respective batteries can be instantaneously exhausted to the outside without leaking.

Moreover, in the gas exhaust structure of the battery according to the first aspect of the present invention, the exhaust pipe may include a spiral groove cut on the inner wall thereof, and the spiral groove may be formed into a structure having a shape capable of forming a spiral groove for the battery column in such a manner that the spiral grooves are coupled to one another sequentially and continuously when a large number of the batteries are stacked on one another.

With such a configuration, when a large number of the batteries are stacked on one another, the respective exhaust pipes in which the spiral grooves are cut on the inner walls are coupled to one another sequentially and continuously, whereby the gas exhaust passage for the battery column can be formed. Therefore, a large amount of the gas that transmits along the spiral groove cut on an inner wall of the gas exhaust passage for the battery column can be efficiently guided toward a direction of an exhaust port without leaking, and can be instantaneously exhausted to the outside.

Moreover, in the above-described configuration, the spiral groove cut on the inner wall of the exhaust pipe may be cut to be one or two to thereby establish a fixed cycle or a variable cycle together with the spiral grooves cut on the inner walls of the other exhaust pipes, and may have a shape capable of forming one or two spiral grooves for the battery column in such a manner that the spiral grooves, each one or two of which are cut on each inner wall, are coupled to one another sequentially and continuously when a large number of the batteries are stacked on one another.

With such a configuration, when a large number of the batteries are stacked on one another, the respective exhaust pipes, in each of which one or two spiral grooves are cut on the inner wall to thereby establish the fixed cycle or the variable cycle together with the spiral grooves cut on the inner walls of the other exhaust pipes, are coupled to one another sequentially and continuously, whereby the gas exhaust passage for the battery column can be formed. Therefore, a large amount of the gas that transmits along the one or two spiral grooves cut in the fixed cycle or the variable cycle on the inner wall of the gas exhaust passage for the battery column can be efficiently guided toward the direction of the exhaust port without leaking, and can be instantaneously exhausted to the outside.

Moreover, in the gas exhaust structure of the battery according to the first aspect of the present invention, a configuration may be adopted, in which, when the battery column is composed by stacking a large number of the batteries on one another, offset directions at relative positions between the exhaust pipes and the gas spouting valves are set alternate with one another between each pair of the stacked batteries.

With such a configuration, even in the case where the gas spouts out simultaneously from the gas spouting valves of a large number of the stacked batteries, forces applied to the respective pipe units of the batteries become alternate with one another between each pair of the batteries adjacent to each other, and the forces can be distributed.

In accordance with the gas exhaust structure of the battery according to the first aspect of the present invention, the collision pressure of the gas flow that orthogonally collides with the specific spot of the inner wall of the exhaust pipe is weakened. As a result, the inner wall of the exhaust pipe can be thinned more than heretofore, and accordingly, the weight per battery is reduced. Therefore, the weight of the battery column composed by stacking a large number of such batteries on one another is reduced in proportion to the number of batteries. Hence, a gas exhaust structure of a battery, in which the inconvenience does not occur at the time of exchanging the battery column, can be provided.

BRIEF DESCRIPTION OF THE DRAWINGS

FIG. 3 is a view showing a state of the gas exhaust structures coupled to one another when a large number of the batteries are stacked on one another.

DETAILED DESCRIPTION OF THE EMBODIMENTS

Figure 1A:
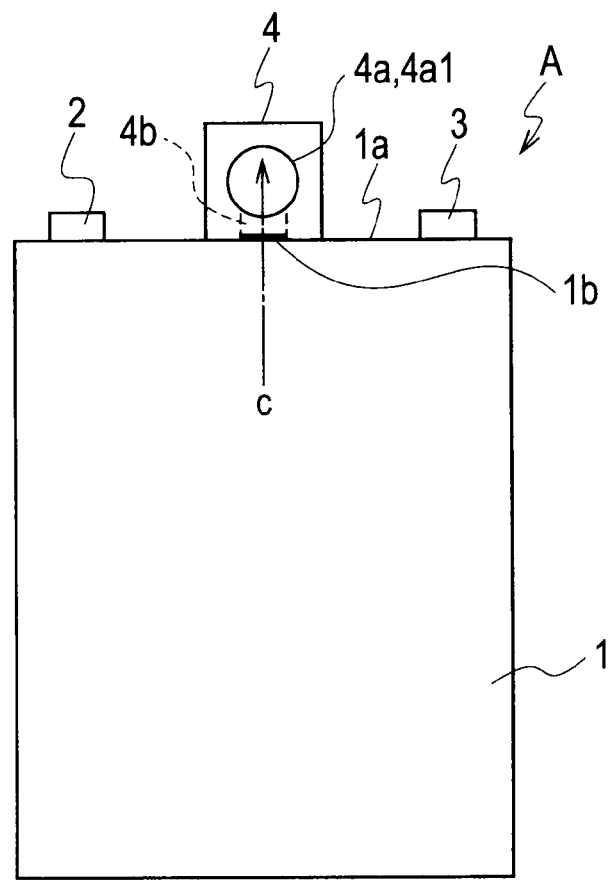
FIG. 1A is a side view for explaining a conventional gas exhaust structure of a battery.
Figure 1B:
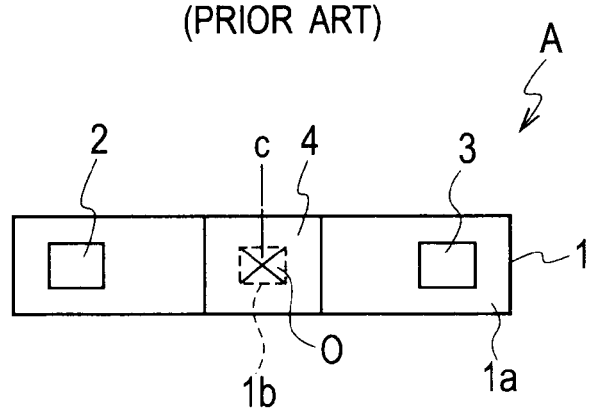
FIG. 1B is a plan view for explaining the conventional gas exhaust structure of the battery.

A description will be made below of embodiments of a gas exhaust structure of a battery according to the present invention by using FIG. 2 to FIG. 9. Note that the same reference numerals are assigned to the same portions as those mentioned above.

Figure 2A:
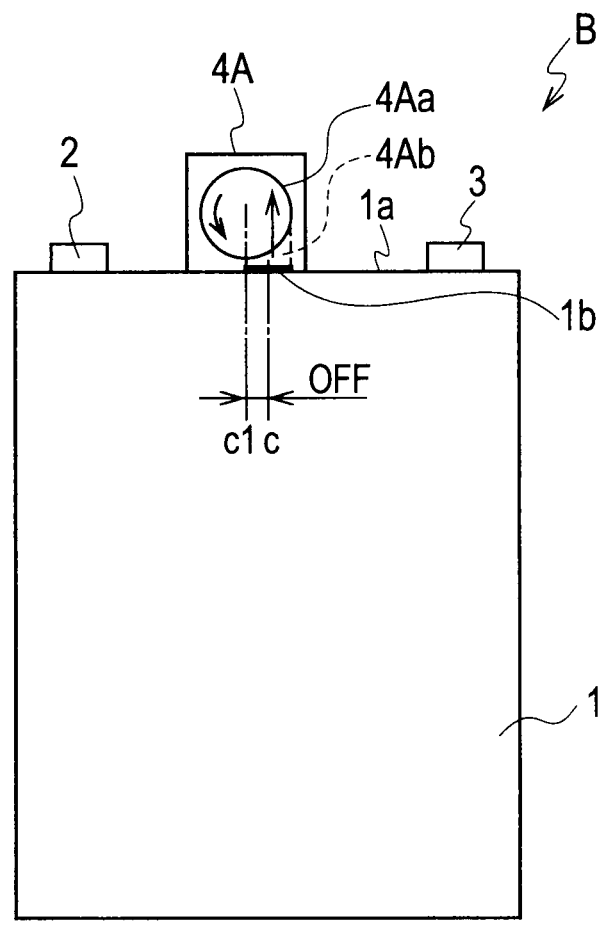
FIG. 2A is a side view for explaining an embodiment of a gas exhaust structure of a battery according to the present invention.
Figure 2B:
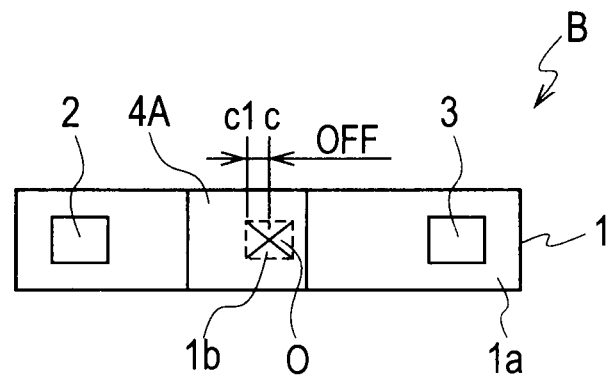
FIG. 2B is a plan view for explaining the embodiment of the gas exhaust structure of the battery according to the present invention.

As shown in FIGS. 2A and 2B, a unitized battery B includes a battery body 1, positive and negative electrodes 2 and 3, and a pipe unit 4A. The positive and negative electrodes 2 and 3 are individually provided on both end portions of an upper portion 1a of the battery body 1. Moreover, on the upper portion 1a located between the positive and negative electrodes 2 and 3, an incision is incised as shown in FIG. 2B. Then, this incision is broken from an inside of the body 1 at the time when gas spouts, whereby a rupture valve 1b is formed. Once the rupture valve 1b is formed, it becomes impossible to reuse the battery B.

The pipe unit 4A as a coupling pipe unit instantaneously guides the gas, which spouts out from the inside of the battery body 1 through the rupture valve 1b, to an outside of the battery body 1, and then rapidly exhausts the gas to the outside. The pipe unit 4A is composed by integrating an exhaust pipe 4Aa and a coupling pipe 4Ab with each other. The coupling pipe 4Ab that has a one-side opening coupled to the rupture valve 1b is coupled to the exhaust pipe 4Aa by an other-side opening thereof. A centerline c1 of the exhaust pipe 4Aa and an extended line c that passes through a center O of the rupture valve 1b are separated from each other by a predetermined width OFF without being perpendicular to each other. Specifically, the exhaust pipe 4Aa of the pipe unit 4A is offset by the predetermined width OFF with respect to the rupture valve 1b.

As shown in FIG. 2B, the pipe unit 4A is attached to the upper portion 1a of the battery body 1 leftward by the predetermined width OFF with respect to the rupture valve 1b. Moreover, a pipe unit 4A3 shown in FIG. 9 to be described later is attached to the upper portion 1a of the battery body 1 rightward by the predetermined width OFF with respect to the rupture valve 1b.

As shown in FIG. 3, each of the batteries B (B1, B2, B3, B4 . . . , Bn) includes a tip end opening 4a and a rear end opening 4b on both ends of the exhaust pipe 4Aa, and includes a fitting portion 4b1, which is tightly fittable to the tip end opening 4a of the exhaust pipe 4Aa of the other battery B, on a peripheral edge of the rear end opening 4b.

Figure 6:
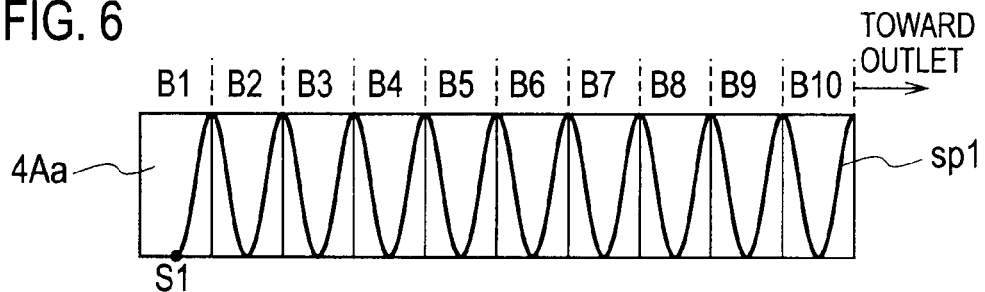
FIG. 6 is a view for explaining a state of coupling spiral grooves cut on inner walls of the exhaust pipes to one another sequentially and continuously, and forming a gas exhaust passage for a battery column.
Figure 7:
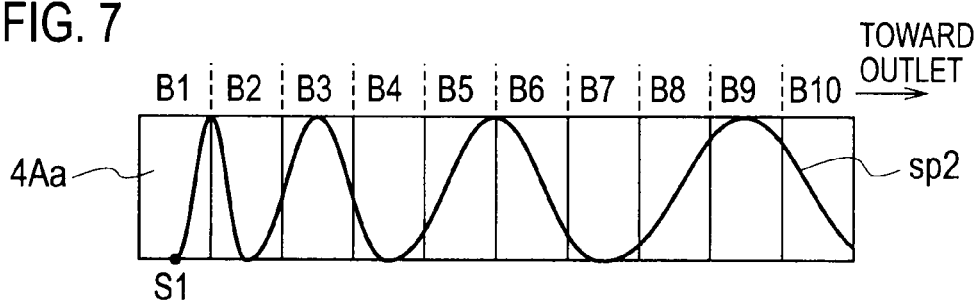
FIG. 7 is a view for explaining a state of coupling spiral grooves cut on the inner walls of the exhaust pipes to one another sequentially and continuously, and forming a gas exhaust passage for the battery column.
Figure 8:
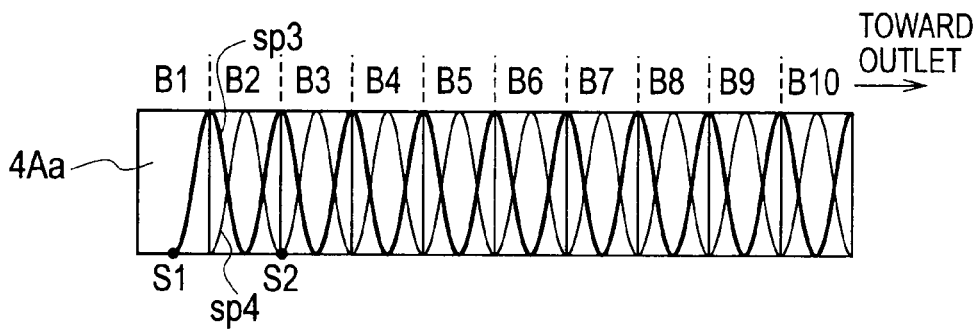
FIG. 8 is a view for explaining a state of coupling spiral grooves cut on the inner walls of the exhaust pipes to one another sequentially and continuously, and forming a gas exhaust passage for the battery column.
Figure 9:
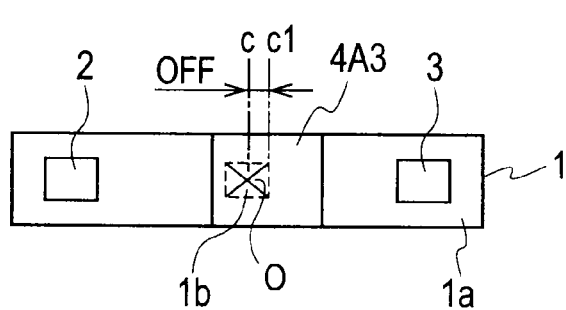
FIG. 9 is a plan view showing another embodiment of the gas exhaust structure of the battery according to the present invention.

As shown in FIG. 3, in the case where, for example, four pieces of the above-described batteries B (B1, B2, B3, B4 . . . , Bn) are longitudinally connected and stacked to one another to thereby form a battery column BL, the fitting portion 4b1 of the rear end opening 4b present in the exhaust pipe 4Aa of the battery B1 on the front left side in FIG. 3 among the batteries B1, B2, B3 and B4 is tightly fitted to the tip end opening 4a of the exhaust pipe 4Aa of the battery B2 immediately after the battery B1. Then, the fitting portion 4b1 of the rear end opening 4b concerned is tightly fitted to the tip end opening 4a of the exhaust pipe 4Aa of the battery B3 immediately after the battery B2. As described above, the fitting portions 4b of the respective exhaust pipes 4Aa of the batteries B2, B3 and B4 are sequentially fitted and coupled to the tip end openings 4a. In such a way, the batteries B1, B2, B3 and B4 are connected in series by being stacked on one another, whereby one gas exhaust passage of the battery column BL can be formed (FIG. 6 to FIG. 8 to be described later).

Here, a description will be made of a reason why the exhaust pipe 4Aa provided in the pipe unit 4A of the battery B and the rupture valve 1b of the battery body 1 are offset with respect to each other. Specifically, a gas flow with a spouting pressure as large as approximately 7 atmospheric pressures, which spouts out from the inside of the battery body 1, passes through the coupling pipe 4Ab and flows into the exhaust pipe 4Aa, transmits smoothly along a curved surface of an inner wall of the exhaust pipe 4Aa without orthogonally colliding with this inner wall. Then, the gas flow is swirled, and the large spouting pressure described above is reduced. In order to give such a function to reduce the spouting pressure to the gas exhaust structure, the exhaust pipe 4Aa is arranged to be offset with respect to the rupture valve 1b by the predetermined width OFF without allowing the extended line c that passes through the center O of the rupture valve 1b and the centerline c1 of the exhaust pipe 4Aa to be perpendicular to each other.

If this offset is not provided, then it is apprehended that the gas flow that flows from the rupture valve 1b side into the exhaust pipe 4Aa may always collide orthogonally with a specific spot of the inner wall of the exhaust pipe 4Aa to thereby cause deterioration and breakage of only the spot concerned. In this case, it is necessary that strength of the inner wall of the exhaust pipe 4Aa be enhanced by increasing a thickness thereof, and accordingly, there is a problem that the exhaust pipe 4Aa itself is upsized.

Meanwhile, since the offset is provided as in the present invention, the gas flow, which flows from the rupture valve 1b side into the exhaust pipe 4A, transmits smoothly along the curved surface of the inner wall without orthogonally colliding with only the specific spot of the inner wall of the exhaust pipe 4Aa even if the thickness of the inner wall concerned is thinned more than in the case where no offset is provided. By this fact, the gas flow is gradually weakened in terms of the spouting pressure by swirling, and goes toward an exhaust port while swirling in the one gas exhaust passage of the above-described battery column BL. In such a way, the spouting gas flow is favorably exhausted.

Figure 4:
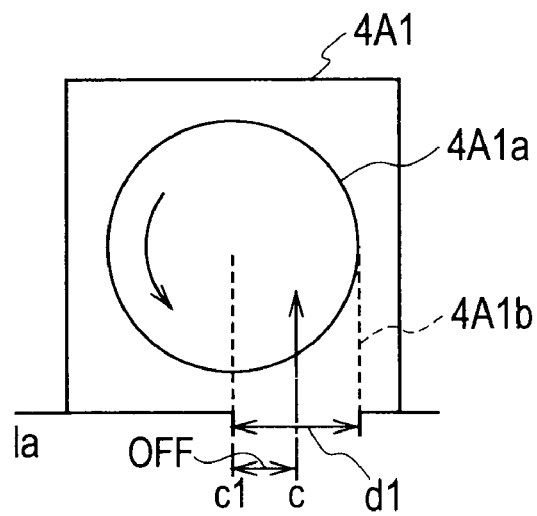
FIG. 4 is a view for explaining a gas flow that is weakened in terms of a collision pressure by swirling in an exhaust pipe.

In an embodiment of FIG. 4, a centerline c1 of an exhaust pipe 4A1a present in a pipe unit 4A1 of the battery B is arranged to be offset by a predetermined width OFF with respect to the extended line c that passes through the center O of the rupture valve 1b of the battery B. By such offset arrangement, the gas flow that flows into the exhaust pipe 4A1a through a coupling pipe 4A1b transmits smoothly along an inner wall of the exhaust pipe 4A1a, swirls counterclockwise, and is weakened in terms of the spouting pressure. In FIG. 4, reference symbol d1 denotes a diameter of the coupling pipe 4A1b.

Figure 5:
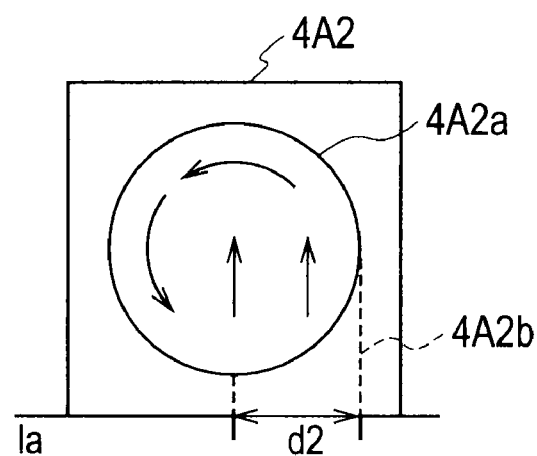
FIG. 5 is a view for explaining a gas flow that is weakened in terms of a collision pressure by swirling in an exhaust pipe.

In an embodiment of FIG. 5, a centerline c1 of an exhaust pipe 4A2a present in a pipe unit 4A2 of the battery B is arranged to be offset by a predetermined width OFF with respect to the extended line c that passes through the center O of the rupture valve 1b of the battery B. Moreover, as expressed by d2>d1, a diameter d2 of a coupling pipe 4A2b is set larger than the diameter d1 of the coupling pipe 4A1b and width of the rupture valve 1b. With such a configuration, the gas flow that spouts out from the rupture valve 1b is weakened by this coupling pipe 4A2b, and the gas flow in which the spouting pressure is weakened flows into the exhaust pipe 4A2a. Thereafter, the gas flow transmits along an inner wall of the exhaust pipe 4A2a, swirls counterclockwise, and is weakened in terms of the spouting pressure.

In an embodiment of FIG. 6, a large number of the above-mentioned batteries B (B1, B2, B3, B4 . . . , Bn) are stacked on one another. Here, the case where the battery column BL is composed of ten pieces of the batteries B1 to B10 is taken as an example. At this time, as mentioned above, the batteries B2 to B9 are coupled to one another in such a manner that the fitting portions 4b1 of the respective exhaust pipes 4Aa are sequentially fitted to the respective tip end openings 4a (FIG. 3). Then, on an inner wall of the gas exhaust passage for the battery column BL composed of ten pieces of the batteries B1 to B10, that is, on the inner walls of the respective exhaust pipes 4Aa, one spiral groove sp1 that has a fixed cycle is formed toward the exhaust port (outlet direction). The number of batteries which compose the battery column BL is appropriately changeable according to needs.

In such a way, a large amount of the gas that spouts out individually from the battery bodies 1 of the respective batteries B1 to B10 transmits along the spiral groove sp1 without leaking, and is instantaneously exhausted to the outside. Moreover, in FIG. 6, reference symbol s1 denotes a start position of the spiral groove sp1, and the start position s1 is located at a position corresponding to a center of the coupling pipe 4Ab of the battery B1.

In an embodiment of FIG. 7, when a large number of the above-mentioned batteries B (B1, B2, B3, B4 . . . , Bn) are stacked on one another, on the gas exhaust passage for the battery column BL composed of, for example, ten pieces of the batteries B1 to B10 in a similar way to the above, that is, on the inner walls of the respective exhaust pipes 4Aa, one spiral groove sp2 in which a period of the spiral becomes gradually large is formed toward the exhaust port (outlet direction). In FIG. 7, reference symbol s1 denotes a start position of the spiral groove sp2, and the start position s1 is located at the position corresponding to the center of the coupling pipe 4Ab of the battery B1.

In such a way, a large amount of the gas that spouts out individually from the battery bodies 1 of the respective batteries B1 to B10 transmits along the spiral groove sp2 without leaking, and is instantaneously exhausted to the outside. Moreover, in response to a change of the period of the spiral groove sp2, a flow rate of the gas becomes gradually fast toward the direction of the exhaust port. Therefore, the gas is efficiently exhausted to the outside without leaking.

In an embodiment of FIG. 8, when a large number of the above-mentioned batteries B (B1, B2, B3, B4 . . . , Bn) are stacked on one another, on the gas exhaust passage for the battery column BL composed of, for example, ten pieces of the batteries B1 to B10 in a similar way to the above, that is, on the inner walls of the respective exhaust pipes 4Aa, two spiral grooves sp3 and sp4 are formed sequentially and continuously.

In such a way, a large amount of the gas that spouts out individually from the respective batteries B1 to B10 can be instantaneously exhausted to the outside without leaking. Moreover, the two spiral grooves sp3 and sp4 are provided, and accordingly, the entirety of the gas that accumulates in the gas flow passage is efficiently exhausted toward the direction of the exhaust port. In FIG. 8, reference symbols s1 and s2 denote start positions of the spiral grooves sp3 and sp4, respectively.

Moreover, as mentioned above, the pipe unit 4A is attached to the upper portion 1a of the battery body 1 leftward by the predetermined width OFF with respect to the rupture valve 1b as shown in FIG. 2B. Meanwhile, in an embodiment of FIG. 9, the pipe unit 4A3 is attached to the upper portion 1a of the battery body 1 rightward by the predetermined width OFF with respect to the rupture valve 1b. With regard to such an offset direction at a relative position between the exhaust pipe 4Aa and the rupture valve 1b as a gas spouting valve, when the battery column BL is composed by stacking a large number of the batteries B on one another, the offset directions of the respective batteries B are set alternate with one another in such a way that the offset direction of the battery B1 is set leftward, the offset direction of the next battery B2 is set rightward, the offset direction of the battery B3 is set leftward, and so on. With such a configuration, even in the case where the gas spouts out simultaneously from the rupture valves of a large number of the stacked batteries, forces applied to the respective pipe units of the batteries become alternate with one another between each pair of the batteries adjacent to each other, and the forces are distributed.

As described above, in accordance with the respective embodiments of the present invention, a collision pressure of the gas flow that orthogonally collides with the specific spot of the inner wall of the exhaust pipe can be weakened. As a result, the inner wall of the exhaust pipe can be thinned more than heretofore, and accordingly, a weight per battery is reduced. Therefore, a weight of the battery column composed by stacking a large number of such batteries on one another is reduced in proportion to the number of batteries. Hence, there can be provided a gas exhaust structure of a battery, in which inconvenience does not occur at the time of exchanging the battery column, and which is capable of efficiently exhausting the spouting gas to the outside in a short time.

What is claimed is:

1. A gas exhaust structure of a battery column stacking two or more batteries, the gas exhaust structure provided in each of the batteries, comprising:
   a gas spouting valve formed in a battery body of each of the batteries; and
   a pipe unit composed by integrating a coupling pipe and an exhaust pipe with each other,
   wherein a one-side opening of the coupling pipe is coupled to the gas spouting valve,
   the exhaust pipe is coupled to an other-side opening of the coupling pipe of an adjacent stacked battery, the exhaust pipe for guiding gas spouted out from an inside of the battery body through the gas spouting valve and the one-side opening of the coupling pipe, and exhausting the gas to an outside, and
   the exhaust pipe is arranged to be offset with respect to the gas spouting valve without allowing an extended line that passes through a center of the gas spouting valve and a centerline of the exhaust pipe to be perpendicular to each other.

2. The gas exhaust structure according to claim 1, wherein the exhaust pipe has a shape capable of forming a gas exhaust passage for the battery column when the exhaust pipe is coupled to the exhaust pipe of an adjacent stacked battery.

3. The gas exhaust structure according to claim 2, wherein the exhaust pipe includes a spiral groove cut on an inner wall thereof, and the spiral groove has a shape capable of forming a continuous spiral groove for the battery column as the gas exhaust passage when the spiral groove is coupled to the spiral groove of the adjacent stacked battery.

4. The gas exhaust structure according to claim 3, wherein the continuous spiral groove for the battery column has a fixed period.

5. The gas exhaust structure according to claim 3, wherein the exhaust pipe further includes another one spiral groove cut on an inner wall thereof, the spiral grooves have shapes capable of forming two continuous spiral grooves for the battery column as the gas exhaust passage when the spiral grooves are coupled to the spiral grooves of the adjacent stacked battery, and each of the continuous spiral grooves for the battery column has a fixed period.

6. The gas exhaust structure according to claim 3, wherein the continuous spiral groove for the battery column has a variable period.

7. The gas exhaust structure according to claim 3, wherein the exhaust pipe further includes another one spiral groove cut on an inner wall thereof, the spiral grooves have shapes capable of forming two continuous spiral grooves for the battery column as the gas exhaust passage when the spiral grooves are coupled to the spiral grooves of the adjacent stacked battery, and each of the continuous spiral grooves for the battery column has a variable period.

8. The gas exhaust structure according to claim 2, wherein a relative shift direction between the exhaust pipe and gas spouting valve is an opposite direction compared with that of the adjacent stacked battery.

* * * * *